United States Patent [19]
O'Brien

[11] Patent Number: 6,022,082
[45] Date of Patent: Feb. 8, 2000

[54] TRACTION DEVICE FOR VEHICLE WHEELS

[75] Inventor: John M. O'Brien, Tualatin, Oreg.

[73] Assignee: Traction on Demand LLC, Tualatin, Oreg.

[21] Appl. No.: 09/105,920

[22] Filed: Jun. 27, 1998

Related U.S. Application Data

[63] Continuation-in-part of application No. 08/733,676, Oct. 17, 1996, Pat. No. 5,788,335.

[51] Int. Cl.[7] .................................................... B60B 15/00
[52] U.S. Cl. ......................... 301/45; 301/40.6; 301/41.1; 152/216
[58] Field of Search .................................. 301/38.1, 39.1, 301/40.1, 40.2, 40.3, 40.6, 41.1, 45, 46, 43, 36.1, 36.3, 47, 49, 52; 152/210, 211, 216, 220

[56] References Cited

U.S. PATENT DOCUMENTS

| | | |
|---|---|---|
| 2,079,501 | 5/1937 | Gallagher . |
| 2,174,944 | 10/1939 | Leggett . |
| 2,201,632 | 5/1940 | Roessel . |
| 2,241,849 | 5/1941 | Fuchs . |
| 2,254,318 | 9/1941 | Roessel ..................................... 301/47 |
| 2,377,923 | 6/1945 | Cawley . |
| 2,559,721 | 7/1951 | Kruse . |
| 2,638,384 | 5/1953 | Colin . |
| 2,751,959 | 6/1956 | Bloomquist ........................ 301/36.1 X |
| 2,765,199 | 10/1956 | Partin . |
| 2,903,037 | 9/1959 | Palmer . |
| 3,995,909 | 12/1976 | Vander Lely . |
| 5,810,451 | 9/1998 | O'Brien ................................... 301/45 |

FOREIGN PATENT DOCUMENTS

| | | | |
|---|---|---|---|
| 236041 | 9/1987 | European Pat. Off. .............. | 301/40.1 |
| 723612 | 4/1932 | France ................................. | 301/38.1 |
| 1066702 | 4/1954 | France ................................. | 301/40.1 |
| 2556656 | 6/1985 | France ................................. | 301/40.2 |
| 198148 | 6/1958 | Germany . | |
| 2901606 | 7/1980 | Germany ............................. | 301/36.3 |
| 3001483 | 7/1981 | Germany ............................. | 301/52 |

*Primary Examiner*—Russell D. Stormer
*Attorney, Agent, or Firm*—Robert L. Harrington

[57] ABSTRACT

A traction device for vehicle wheels has an expandable and contractible member mounted next to the vehicle wheel. The traction device has a tire with extending studs that is expandable by air pressure to increase the diameter of the tire. The tire is contracted by releasing the pressurized air within. The tire is expanded to a diameter just larger than the vehicle wheels so that the studs will engage the roadway to provide traction. The tire may be inflated manually from a pressurized air source and deflated manually. A pressure source and control valves may be provided to control the inflation and deflation of the tire remotely.

3 Claims, 3 Drawing Sheets

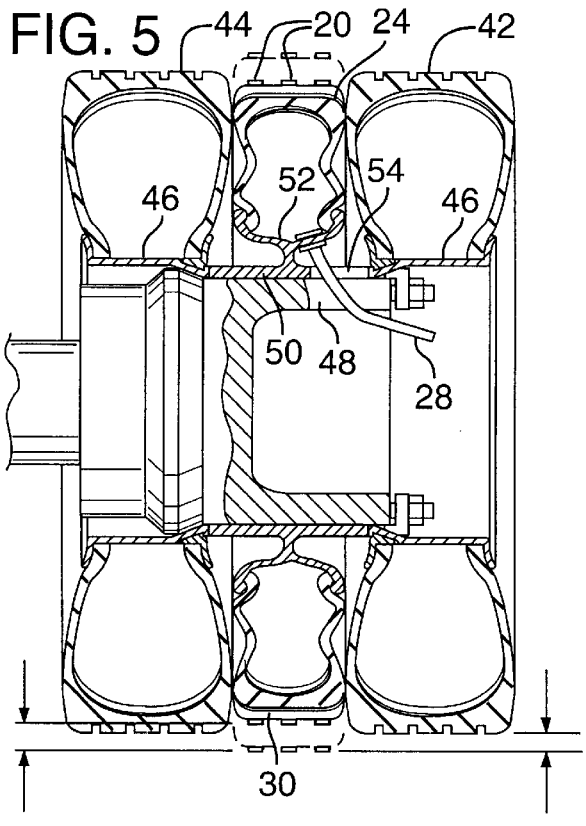
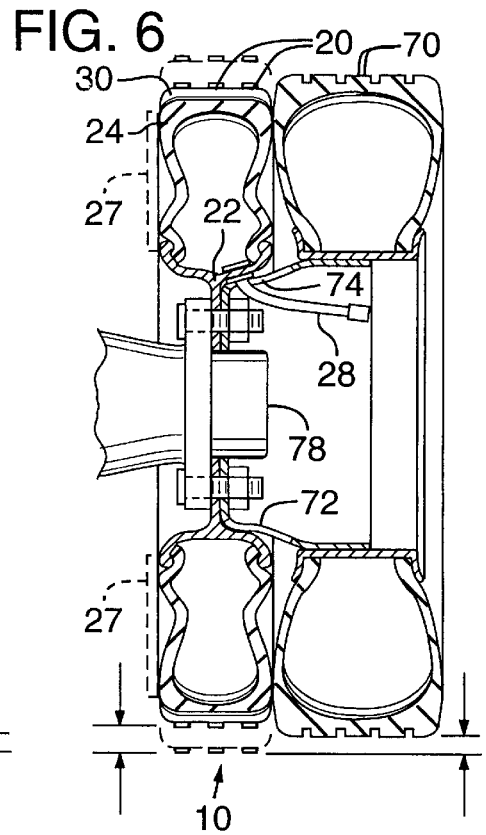
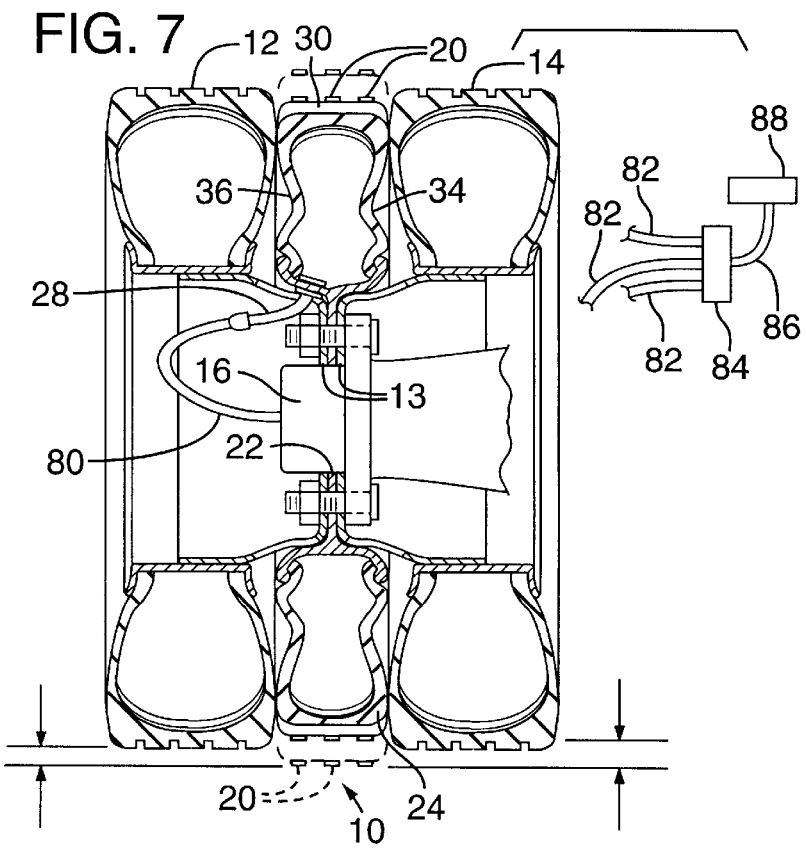

TRACTION DEVICE FOR VEHICLE WHEELS

This application is a continuation-in-part of application Ser. No. 08/733,676 filed on Oct. 17, 1996, now U.S. Pat. No. 5,788,335.

FIELD OF THE INVENTION

This invention relates to a traction device mounted to a vehicle wheel and is selectively convertible to road engaging and non-road engaging positions.

BACKGROUND OF THE INVENTION

This invention has particular application to dual wheels as exist on large trucks. However, as will be made clear, different forms of the invention can be applied to different types of vehicle wheels.

The invention is considered most applicable to large trucks driven by truck drivers that crisscross the country continuously throughout the year. Invariably a truck driver driving over mountain roads in the winter or even flat land roads in the Northern states, will on many occasions encounter road conditions where snow and/or ice is coated over the road surface.

The conventional wheel tire provides a road contacting surface area that frictionally grips a dry or even wet road surface providing steering and stopping control as well as propulsion over the road surface, but not when that surface is covered with ice and/or snow. The conventional tire surface has poor frictional gripping capability when riding on snow or ice. Whereas several explanations can be given depending on the condition of the ice/snow, what can and often does happen is that the surface of the snow or ice liquefies and forms a liquid film between the tires and underlying surface, thereby eliminating any opportunity for the tire to grip the surface frictionally.

An answer to this dilemma is to provide the tire with metal studs or chains. The studs are embedded in the tire permanently and the chains are designed to be placed on the tire when needed and removed when not needed. In both cases, the projecting metal bites down through the snow or ice (and liquid film) to generate the desired gripping action. Both have problems. Studded tires tear up a dry road surface, i.e., when not covered with snow or ice and most states have strict rules about using them. Most states ban their use except during the harsh winter months. Tire chains are designed to be put on and taken off. However, mounting the chains onto the vehicle tires is an unpleasant task even in ideal conditions which most often is not the case. Weather conditions are likely uncomfortably cold and blustery. Mounting the chains onto the tires can take upwards to an hour or more, and when parked alongside an ice-covered roadway and probably on a graded road, the driver is exposed to potential life threatening risks as other unchained vehicles attempt to pass.

BRIEF DESCRIPTION OF THE INVENTION

The present invention alleviates or obviates the problems associated with studded tires and the chaining of tires using a retractable studded tire having metal spike-like studs that project from the periphery of the tire and into the road surface or not. In a preferred embodiment, the studded tire is sandwiched between dual tires. The studded tire is designed to expand in circumference when inflated and to contract in circumference when deflated. This is achieved in part by the opposing walls of the dual tires that restrict lateral or axial expansion of the studded tire, thus forcing expansion circumferentially or radially. The expansion characteristics of the tire are designed to provide a circumferential size difference so that when deflated, the tire periphery (circumference) is retracted radially inwardly of the dual tires and when inflated is extended radially outwardly of the dual tires.

The studded tire of this preferred embodiment is not intended to carry the vehicle weight. Essentially the stud portions only of the tire protrude and are projected into the ice or snow, e.g., to a depth at which the dual tires still engage the road surface and support the load. The studs provide gripping action for propelling (or stopping) the vehicle as the studded tire rotates in unison with the dual tires, e.g., the studded tire is mounted on the same tire lugs and the expansion of the studded tire against the opposing side walls, rubber to rubber, resists rotative slippage of the studded tire relative to the load-bearing dual tires.

The studded tire is provided with valving and an air pressure source. The air pressure source may be operated automatically and remotely with direct connection between the air pressure source and the studded tire, or the air source may be an air-pressurized cannister that can be clamped to the valving for inflating the tire. Deflation is enabled, e.g., by a valve mechanism that simply exhausts the air from the studded tire to the atmosphere.

Ideally the inflation/deflation will be accomplished automatically from the truck cab even without the necessity of stopping the truck. The less sophisticated embodiment will allow the driver to stop the truck and in a matter of a few minutes inflate the several studded tires in a fraction of the time previously allotted for mounting tire chains.

An alterative embodiment that is contemplated will adapt the above expanding feature of an expandable studded tire to a single load-bearing tire. The studded tire would be mounted between a rigid wall, e.g., a plate provided either as part of the studded tire or independently mounted, e.g., to the tire studs. The rigid plate would preferably be mounted inside the exposed single tire. Circumferential expansion would be produced by the confining space between the rigid wall and the single tire wall.

Other attempts have been made to provide a gripping member that can be left on the tires and would project into the road surface only when needed. An example of such an attempt is disclosed in E. Partin, U.S. Pat. No. 2,765,199. Among other differences, Partin does not teach the basic concept of using a studded tire that is expanded in the confining space between dual tires whereby the stationary tire walls induce circumferential expansion of the studded tire beyond the circumference of the dual tires.

Reference is made to the detailed description and drawings referred to therein for a thorough understanding of the invention.

DESCRIPTION OF THE DRAWINGS

FIG. 5 is another embodiment of the traction device;

FIG. 6 is an embodiment of the traction device as applied to a single wheel; and FIG. 7 illustrates the traction device including an air source for automatic actuation of the device.

DESCRIPTION OF THE PREFERRED EMBODIMENT

Figure 1:
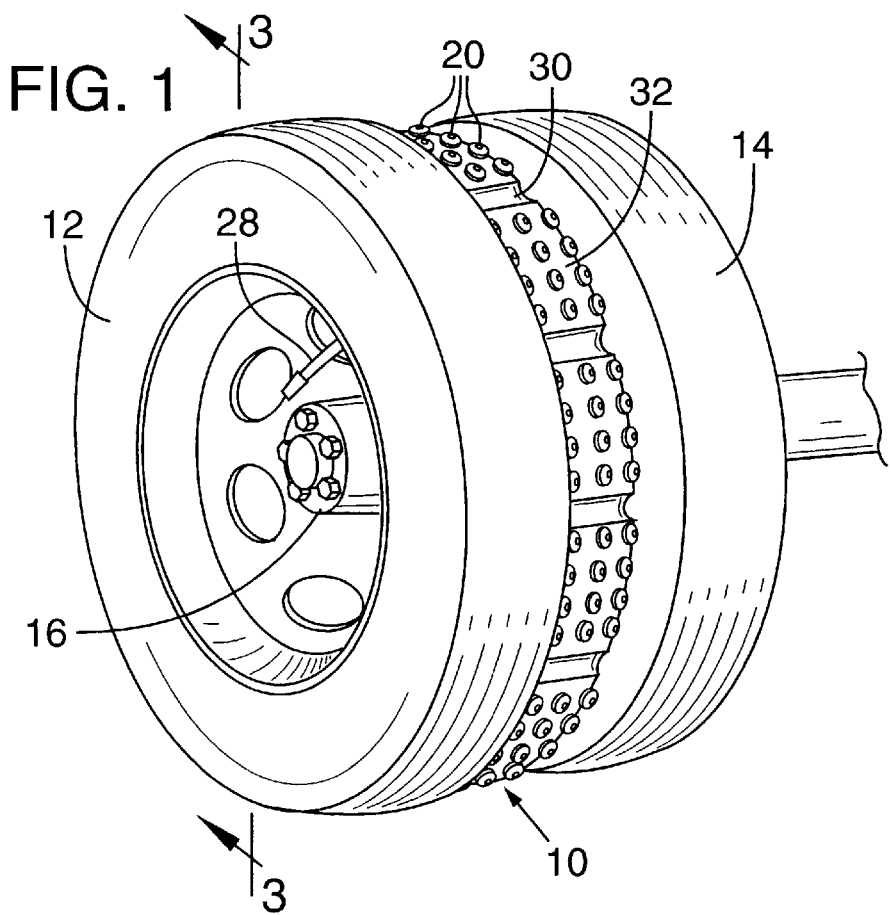
FIG. 1 is a perspective view of one embodiment of the traction device of the present invention mounted between dual wheels.

Refer now to FIG. 1 of the drawings that illustrates a traction device 10 mounted between a set of dual wheels 12, 14. The wheels 12, 14 are alike and are given separate numbers to distinguish their mounting position. As noted in FIG. 3, the tire 24 in the deflated state accordingly assumes an hour glass shape in the deflated condition. The dual wheels 12, 14 are mounted on a common wheel housing 16 and as shown the outer wheel 12 is spaced from the inner wheel 14. This is typical of the dual wheel mounting arrangement in which a space is provided between the outer wheel 12 and the inner wheel 14. Note from FIG. 3 that the rim 13 of both of the inner dual wheel 14 and outer dual wheels 12 are mounted to the wheel housing 16 on conventional mounting lugs 15 (or bolts) that retain the inner wheel 14 and outer wheel 12 securely onto the wheel housing 16. The configuration of the rims 13 of the outer wheel 12 and the inner wheel 14 positions the wheels 12, 14 at a distance from each other as will be noted from FIGS. 1 and 3.

Figure 2:
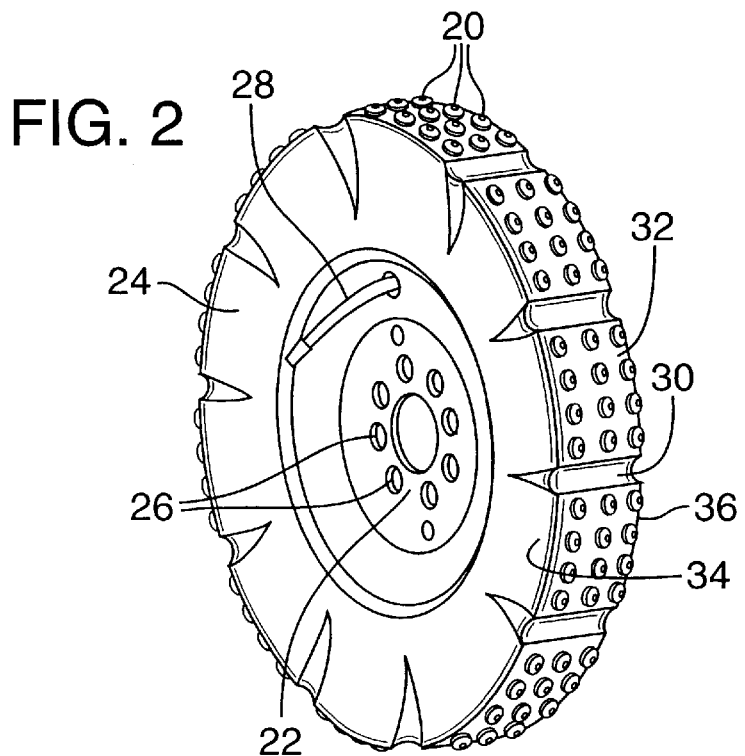
FIG. 2 is a perspective view of the traction device only.
Figure 4:
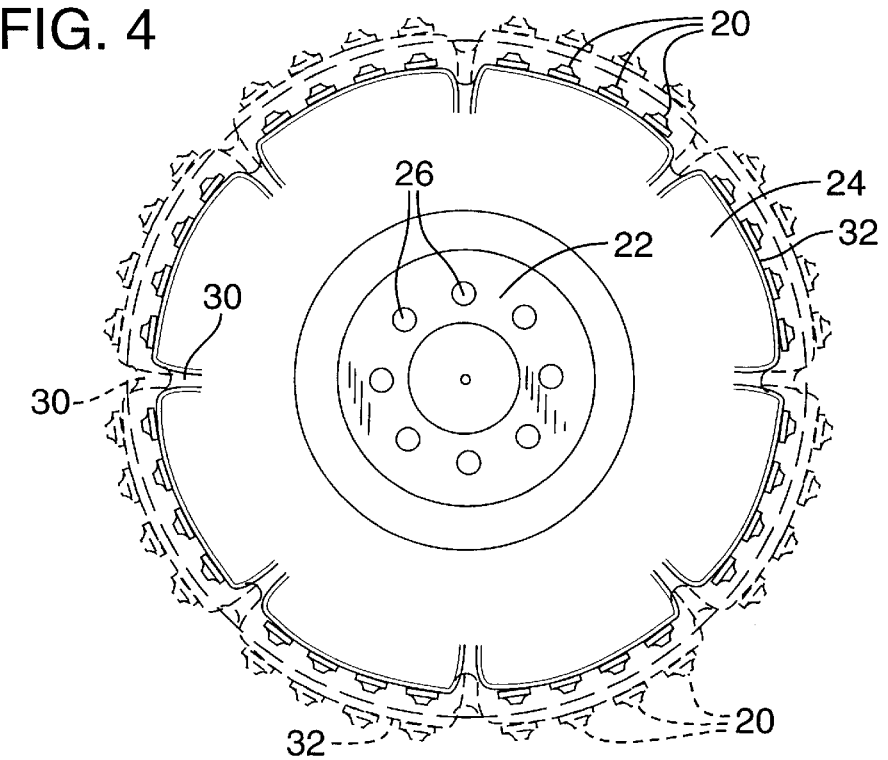
FIG. 4 is a side view of the traction device of FIG. 2 showing both retracted and expanded (in phantom) conditions thereof.

The traction device 10 not assembled to the dual tires is illustrated in FIGS. 2 and 4. The traction device 10 has a rim 22 on which a tire 24 of the traction device 10 is mounted. The rim 22 has holes 26 that are alignable with the mounting lugs or bolts 15 of the wheel housing 16. A valve stem 28 (FIG. 2) is provided to inflate the tire 24 by pressurized air and to deflate the tire 24 by exhausting the pressurized air. The tire 24 of the traction device 10 has studs 20 extending from its peripheral surface 32. The tire 24 has expansion slots 30 that are arranged to permit the radial expansion and contraction of the tire 24. As shown, the slots 30 extend across the peripheral surface 32 of the tire 24 and extend into the side walls 34, 36. The tire 24 is arranged to expand radially as pressurized air is introduced via the valve stem 28.

The introduction of pressurized air through the valve stem 28 to the interior of the tire 24 will force the tire 24 to expand radially outward and thus increase its diameter. The slots 30 are configured to enhance the uniform radial expansion of the tire 24 and to minimize the axial or lateral expansion of the tire 24. All three tires 12, 14, and 24 being resilient are resistively deformed or compressed under the weight of the vehicle until the vehicle weight is supported by the combined resistance of the tires, i.e., all three tires are in contact with the supporting surface or roadway.

Figure 3:
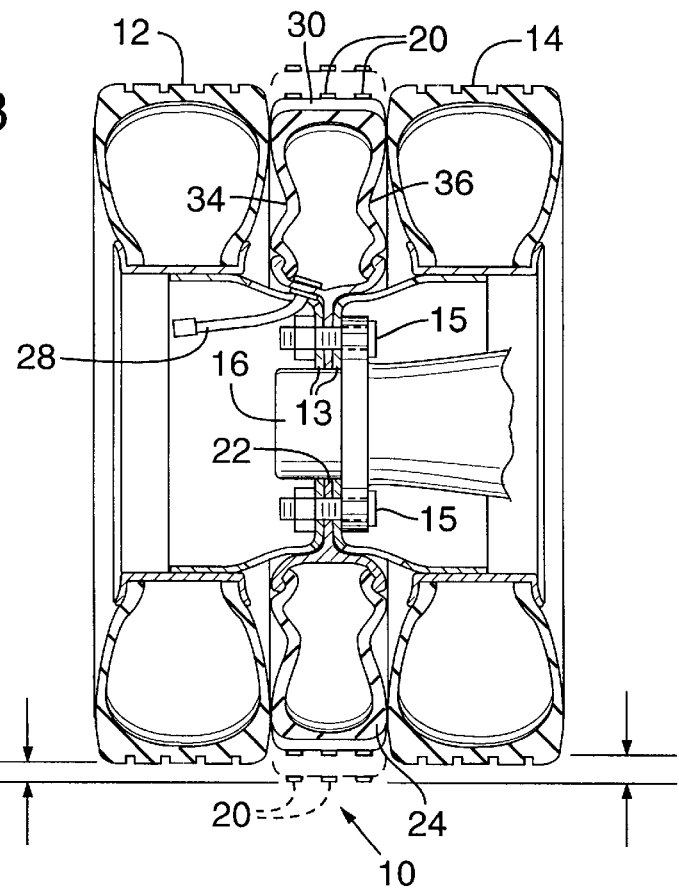
FIG. 3 is a sectional view as viewed on view lines 3—3 of FIG. 1.

The mounting arrangement of the traction device 10 is further illustrated in the sectional view of FIG. 3. In this embodiment, the wheels 12, 14 are of the same construction and have been assigned numbers 12, 14 to distinguish the inner wheel from the outer wheel. Wheels 12, 14 have a rim 13 that has a hole pattern that mates with the conventional mounting lugs of the wheel assembly 16.

As shown in FIG. 3, the rim 22 of the traction device 10 is sandwiched between the rims 13 of the inner wheel 14 and outer wheel 12. The rim 13 of the wheels 12, 14 and the rim 22 of the traction device 10 are mounted to the wheel assembly 16 and are secured by the mounting lugs or bolts 15. The traction device 10 is thus rotatable with the wheels 12, 14. The valve stem 28 extends through a conventional opening provided in the rim 13 of the wheels 12. This provides access to the valve stem 28 for inflating and deflating the tire 24 of the traction device 10. As shown in the figure, the tire 24 of the traction device 10 is illustrated in the deflated state (contracted) in solid lines and the tire 24 is shown in the inflated (expanded) state in dashed lines. In the contracted state, the tire 24 has been deflated to contract radially inward and thus the diameter of the tire 24 is less than the diameter of the wheels 12, 14. In the expanded state the tire 24 has been inflated with pressurized air to expand the tire radially to exceed the diameter of the wheels 12, 14.

The illustration of the tire 24 in the expanded state is exaggerated for illustrative purposes. The tire 24 is expanded such that the studs 20 will extend beyond the diameter of the wheels 12, 14 to engage the supporting surface (roadway). The wheels 12, 14 still supports the vehicle weight and the tire 24 provides the traction.

Referring to the dashed outline of the tire 24 of the traction device 10 of FIGS. 3 and 4 (which shows the traction device 10 in the expanded state) the tire 24 has been inflated by pressurized air. The tire 24 has expanded radially such that the diameter of the tire 24 is greater than the wheels 12, 14. The studs 20, when the tire 24 is in the expanded state, will extend beyond the diameter of the wheels 12, 14 to engage the roadway R projected through an ice or snow covering S. The studs 20 in engagement with the roadway R will provide the necessary traction required when the vehicle encounters slippery surfaces caused by ice, snow and the like. (The representation of ice/snow covering S and the projection of the studs to the roadway R is illustrative only of the expandability function of the invention and is not intended to accurately depict the manner by which gripping occurs, e.g., the studs in packed snow or ice conditions will not necessarily penetrate through to the bare roadway.)

FIG. 5 illustrates another known mounting arrangement for dual wheels on a vehicle. The wheels 42, 44 are of the same type and are reversible. That is, wheel 42 can be mounted in the position of wheel 44 and vice versa. Wheels 42, 44 have a rim 46 that is mountable onto a wheel housing spider 48. The conventional mounting of the wheels 42, 44 includes a spacer 50 positioned on the spider 48 between the wheels 42, 44. The spacer 50 is provided to space the wheels 42, 44 from each other on the wheel spider 48. In this embodiment, the spacer 50 is altered to support the traction device 10. The spacer 50 includes a wheel supporting rim 52 on which the tire 24 of the traction device 10 is mounted. The valve stem 28 is extended through a hole 54 provided in the spacer 50 with the valve stem 28 extending between two adjacent spiders 48. The tire 24 of the traction device is inflated to increase the diameter of the tire 24 to that which is larger than the wheels 42, 44 and thus to engage the road surface to provide the necessary traction. Similarly, the tire 24 is deflated to contract the tire 24 radially inward such that its diameter is less than the wheels 42, 44.

FIG. 6 illustrates the traction device 10 arranged for use with a single wheel 70. As shown, the traction device 10 and the wheel 70 are mounted to a wheel assembly 78 on conventional mounting lugs. The wheel 70 has a rim 72 configured to fit against the rim 22 of the traction device 10. The rim 72 has an opening 74 through which the valve stem 28 protrudes. The tire 24 of the traction device 10 is illustrated in the contracted state in solid line and in the expanded state in dashed lines. It is contemplated that the tire 24 may be constructed to have radial as opposed to axial expansion and alternatively a side plate 27 (in phantom lines) may be secured to the tire rim or otherwise to take the place of the moving dual wheel and force radial expansion.

The tire 24 of the traction device is inflated by conventional air sources, such as a compressed air tank. The tire 24 of each traction device 24 mounted on a vehicle may be individually inflated by manually applying pressurized air to each tire 24. Most large dual wheel vehicles have their own on board air source to provide air to the vehicle brakes, air horn and the like. Each tire 24 may thus be coupled to the air source by suitable controls and air lines to remotely inflate and deflate the tires 24 of the traction devices 10. Referring to FIG. 7, an air line 80 is coupled to the valve stem 28 of the tire 24 of the traction device 10. The air line 80 extends through the wheel housing 16 and is coupled to an air line 82 that extends to control valve(s) 84. The control valve 84 is connected to an air supply tank 88 of the vehicle by an air line 86. Additional air lines 82 are provided to couple the control valve 84 to each of the wheel housings 16 (and thus each tire 24). The control valve 84 preferably is arranged to supply air to inflate each tire 24 or deflate each tire either individually or simultaneously. The operator of the vehicle may thus inflate or deflate the tires 24 remotely without the need of stopping the vehicle.

Those skilled in the art will recognize that modifications and variations may be made without departing from the true spirit and scope of the invention. The invention is therefore not to be limited to the embodiments described and illustrated by is to be determined from the appended claims.

I claim:

1. A system for selectively providing enhanced traction to a vehicle's tires comprising:

a pair of expanded rotatable tire portions having non-studded peripheral tread, said pair of tire portions mounted to a common rotatable mounting bracket in fixed spaced apart relation;

an expandable tire portion having a peripheral tread with studs mounted on the tread, said expandable tire portion mounted between and confined by the pair of expanded tire portions, in fixed relation rotatably to the pair of tire portions;

said expandable tire portion as mounted between the pair of tire portions having a deflated configuration and an inflated configuration, said deflated configuration providing said expandable tire including studs projected therefrom with a circumference that is within the circumference of said pair of tire portions and said inflated configuration providing said expandable tire with the studs thereof projected outward of the circumference of said pair of tire portions, said pair of tire portions and said expandable tire portion in its inflated configuration having similar properties of resiliency whereby all three tire portions share a load imposed by the vehicle's weight, and whereby the tread of all three tire portions cooperatively grip a road surface; and a valve mechanism provided for said expandable tire and a media source engageable with said valve mechanism to selectively inflate and deflate said expandable tire.

2. A system as defined in claim 1 wherein the pair of expanded tire portions are a pair of tires and the expandable tire portion is a separate expandable tire having a tread and side walls, said expandable tire provided with expansion slots across the tire tread and at least partially down the side walls at spaced positions around the periphery of the tire to enhance radial expansion and contraction of the tire.

3. A system as defined in claim 2 wherein the configuration of the expandable tire in a deflated state is an hour glass shape.

* * * * *